United States Patent [19]

Folweiler et al.

[11] Patent Number: 5,236,690
[45] Date of Patent: Aug. 17, 1993

[54] PROCESS FOR CHEMICAL VAPOR PURIFICATION OF GROUP IIIA METAL FLUORIDES

[75] Inventors: Robert C. Folweiler, Bedford; Barry C. Farnsworth, W. Bridgewater, both of Mass.

[73] Assignee: GTE Laboratories Incorporated, Waltham, Mass.

[21] Appl. No.: 648,678

[22] Filed: Jan. 31, 1991

[51] Int. Cl.$^5$ .............................................. C01B 9/08
[52] U.S. Cl. .............................. 423/489; 423/DIG. 12
[58] Field of Search ........ 423/489, 133, 136, DIG. 12

[56] References Cited

U.S. PATENT DOCUMENTS

| | | | |
|---|---|---|---|
| Re. 32,777 | 11/1988 | Folweiler et al. | 423/489 |
| 3,995,011 | 11/1976 | Jache et al. | 423/489 |
| 4,012,493 | 3/1977 | Layne et al. | 423/489 |
| 4,108,967 | 8/1978 | Massonne et al. | 423/DIG. 12 |
| 4,341,873 | 7/1982 | Robinson et al. | 501/40 |
| 4,563,338 | 1/1986 | Seon et al. | 423/DIG. 12 |
| 4,578,252 | 3/1986 | Pastor et al. | 423/489 |
| 4,718,929 | 1/1988 | Power et al. | 423/489 |

Primary Examiner—John Niebling
Assistant Examiner—Brian M. Bolam
Attorney, Agent, or Firm—Frances P. Craig

[57] ABSTRACT

A chemical vapor purification process for preparing metal fluorides. The process involves melting a metal selected from the metals forming fluorides suitable for use in fluoride glass and thermodynamically partitionable from cation contaminants, for example aluminum, gallium, or indium. Chlorine, bromine, or iodine is bubbled through a stoichiometric excess of the melt, under reaction conditions selected to result in generation of a gaseous halide of the metal. The gaseous halide is then isolated from the melt and reacted with a gaseous fluorinating agent to form a solid fluoride of the metal.

7 Claims, 1 Drawing Sheet

PROCESS FOR CHEMICAL VAPOR PURIFICATION OF GROUP IIIA METAL FLUORIDES

CROSS REFERENCE TO RELATED APPLICATIONS

This application contains subject matter related to matter disclosed and claimed in commonly assigned U.S. Pat. No. Re. 32,777, a reissue of U.S. Pat. No. 4,652,438. U.S. Pat. No. Re. 32,777 is incorporated herein by reference.

BACKGROUND OF THE INVENTION

This invention relates to preparation of metal halides. More particularly, this invention relates to a process for preparing high purity metal fluorides.

Work on the purification of metal fluorides has intensified greatly in recent years because of interest in such applications of heavy metal fluoride glasses as optical fibers, tunable solid state lasers, and dielectric layers for complex semiconductor structures. Initially, researchers made rapid advances in increasing the purity of these materials. Recently, however, progress has slowed although impurity levels remain orders of magnitude higher than can be tolerated in some applications.

For example, heavy metal fluoride glasses theoretically have the potential for providing extraordinarily low loss optical fibers operating in the 2–4 $\mu$m region of the infrared. One of the most serious hindrances to achieving such low loss fibers is contamination of the glass components with certain divalent transition metals, some rare earth ions, and the hydroxyl ion. These impurities have strong absorptions in the optimum range for optical applications. To exploit the potential for these glasses, it is necessary to bring such impurity levels to as low as one part per billion for some of these contaminants.

A number of purification approaches are presently used, including wet chemical processing and vapor treatment. The well known wet processing method has limitations in its degree of purification because of recontamination from the background levels of contaminants present in the processing chemicals. Most current vapor preparation techniques are limited to dealing with the existing fluoride compound, and suffer from low or non-existent thermodynamic driving force for removal of the contamination. The "reactive atmosphere process" (RAP), used to purify a number of starting materials, has an important effect on the hydroxyl content, but rather little effect on the other contaminants. Physical vapor transport (sublimation) has been used to purify $ZrF_4$, $AlF_3$, $BaF_2$, and $GdF_3$ have been purified by subliming the transition metals out of them, showing greater than an order of magnitude improvement in $Fe^{2+}$, but little effect on the other contaminant ions. Sublimation is limited by the ratio of the vapor pressure of the contaminant species to that of the desired compound.

One of the basic limitations of the above processes is that the starting materials are often of limited purity. Thus the process is required to provide more purification than is reasonable. Additionally, there are fundamental practical limitations on the amount of the contaminants that can be removed because of similarities in vapor pressures of the contaminant compound and its solid solution with the major compound.

Above-referenced U.S. Pat. No. Re. 32,777 describes a chemical vapor purification (CVP) process in which the desired metal ion is selectively extracted because of thermodynamic partitioning between the desired metal cation and the contaminating metal and hydroxyl cations. A reactive transport agent, such as chlorine, bromine, or iodine, is reacted with the desired metal and generates a gaseous metal-containing compound. The gaseous metal-containing compound, containing the highly purified metal cation, is then isolated from the starting materials, which include the excess unreacted metal and any contaminants. The gaseous metal-containing compound is then reacted with a fluorinating agent to form the desired solid metal fluoride in a step that further enhances the purification of the metal fluoride compound. This process, for most metal fluorides for which it is intended, is a great improvement over prior art processes.

However, the presence of a very stable barrier layer of "native" oxides on the surface of certain thermodynamically partitionable metals, for example aluminum, can interfere with the reactions that are fundamental to the above-described CVP process. For the most efficient operation of the process, the reactive transport agent used to form the purified vapor must come into intimate contact with non-oxidized metal over a reasonably large surface area. Also for efficient operation, the volatile compounds formed in the initial reaction between the metal and the reactive transport agent should not be impeded by a surface layer of oxidized metal from being transported from the metal surface.

A typical CVP process for purifying metal involves reacting chlorine with aluminum metal at a temperature above the sublimation temperature of $AlCl_3$ and its dimer $Al_2Cl_6$, i.e. above 183° C. at atmospheric pressure, as shown in Reaction 1:

$$2Al + 3Cl_2 \longleftrightarrow Al_2Cl_6 \uparrow \qquad (1)$$

The reaction is carried out under process conditions which thermodynamically and kinetically sufficiently strongly favor the formation of the desired halide to cause Reaction (1) or its equivalent to to proceed essentially to completion, and thus nearly to equilibrium.

Normally the chlorine reacts vigorously with the aluminum metal where they first come into contact. As the reaction proceeds, more $Al_2Cl_6$ is formed and the active chlorine gas at the metal surface becomes more dilute The reaction thus can become less vigorous.

If, as can occur in the process described in above-referenced U.S. Pat. No. Re. 32,777, a stable oxide barrier layer were formed, residual chlorine could be left unreacted in the vapor stream mixed with the $Al_2Cl_6$. In the case of a particularly stable surface barrier, little $Al_2Cl_6$ may be formed. Thus, when a solid source metal is used, maintaining sufficient exposed surface area for efficient operation may be difficult.

The chlorine, on contact with the aluminum, also attacks the impurities in the aluminum, forming chlorides of these impurities by reactions similar to Reaction 1. To ensure complete partitioning of the impurities from the desired metal, Reaction 1 must be followed by a second reaction to reduce these volatile chlorides of the impurity elements. An example of this reduction is illustrated by Reaction 2, using nickel as the impurity:

$$NiCl_2 + \tfrac{2}{3}Al \rightarrow Ni\downarrow + \tfrac{1}{3}Al_2Cl_6\uparrow \quad (2)$$

Similar reactions are required for the partitioning of other undesired compounds of the 3d transition metal elements such as Fe, Co, and Cu. This second reaction is the actual purification step, since the impurity is reconverted to a low vapor pressure metal form leaving a purified stream of the desired metal chloride. The presence of sufficient exposed metal surface to stimulate the reduction of the volatile halide of the impurity to its metallic form, as shown in Reaction 2, is thus also important to an efficient CVP process.

Reaction 2 has a smaller favorable free energy difference than Reaction 1, thus is not as favored as Reaction 1 if there is an interfering layer on the surface of the metal. The required exposure of the base metal to the reactants can be diminished or even eliminated when the metal surface is coated with an oxide barrier layer.

The barrier layer impeding the reactions is a native oxide film that forms almost instantly when some metals, for example aluminum, are exposed to ambient air. The oxides are formed by the reaction of atmospheric water vapor and oxygen with the base metal. This well known reaction begins within milliseconds after a fresh surface of aluminum metal is exposed to air. The oxides continue to form until a stable oxide barrier layer is present, having sufficient thickness to prevent further exposure of the metal to the ambient atmosphere. In the case of aluminum, the film is very stable and tenacious, and is nearly free of flaws. Since Reaction 3, below, favors the formation of $Al_2O_3$ over that of $Al_2Cl_6$, it is only at such flaws that chlorine gas can penetrate the oxide barrier to react with the underlying metal:

$$Al_2O_3 + 3Cl_2 \rightarrow Al_2Cl_6 + 3/2 O_2 \quad (3) \text{ ps}$$

The equilibrium mole fractions of components in the system $Al_2O_3/Cl_2$ are listed in Table I. These equilibrium mole fractions show that the reverse of Reaction 3, the formation of the oxide, is highly favored thermodynamically over the range of temperatures which is most desirable for CVP processing. (Table I is based on input conditions of one mole of $Al_2O_3$ and two moles of $Cl_2$. Results are shown in Table I only if the mole fraction was at least $10^{-10}$ for at least one temperature.)

TABLE I

| Phase | Equilibrium Mole Fractions @ Temperature, kelvin | | | | |
|---|---|---|---|---|---|
| | 873 | 773 | 673 | 573 | 473 |
| $Al_2Cl_6$ | $1.1^{-08}$ | $6.9^{-10}$ | 0.0 | 0.0 | 0.0 |
| $Al_2O_3(s)$ | $3.3^{-01}$ | $3.3^{-01}$ | $3.3^{-01}$ | $3.3^{-01}$ | $3.3^{-01}$ |
| Cl | $2.9^{-05}$ | $3.2^{-06}$ | $1.9^{-07}$ | $4.1^{-09}$ | $1.8^{-11}$ |
| ClO | $4.2^{-10}$ | $1.8^{-11}$ | 0.0 | 0.0 | 0.0 |
| $Cl_2$ | $6.7^{-01}$ | $6.7^{-01}$ | $6.7^{-01}$ | $6.7^{-01}$ | $6.7^{-01}$ |
| $O_2$ | $1.6^{-08}$ | $1.0^{-09}$ | 0.0 | 0.0 | 0.0 |

Thus when an oxide surface layer is present removal or penetration of the layer by reaction with chlorine alone is not favored, and the equilibrium level of the dimeric form of aluminum chloride is very minute. The ability of this barrier layer to readily reestablish itself when re-exposed to air adds to the difficulty of optimizing the CVP process for metals tending to form such layers.

Removal of the native oxide by chemical or mechanical means requires an extra step, and can be ineffective because the oxide is reestablished so rapidly.

The present invention provides an improved CVP process for purifying metals, which increases the efficiency of the process by permitting unimpeded contact between the reactive transport agent and the metal and by preventing trapping of the resulting gaseous compounds by surface barrier layers.

SUMMARY OF THE INVENTION

In one aspect, the invention is a chemical vapor purification (CVP) process for preparing metal fluorides. The process involves melting a metal selected from the metals forming halides and thermodynamically partitionable from Fe Cu, Ni, and Co cation contaminants to form a melt of the metal. A reactive transport agent selected from chlorine, bromine, and iodine is bubbled through a stoichiometric excess of the melt, under reaction conditions selected to result in generation of a gaseous halide compound of the metal. The gaseous halide compound is then isolated from the melt and reacted with a gaseous fluorinating agent to form a solid fluoride of the metal.

In narrower aspects of the inventive process, the metal is selected from aluminum, gallium, and indium; the reactive transport agent is chlorine; and the fluorinating agent is selected from fluorine gas, sulfur hexafluoride, sulfur tetrafluoride, hydrogen fluoride, and nitrogen trifluoride.

DESCRIPTION OF THE DRAWINGS

For a better understanding of the present invention, together with other objects, advantages and capabilities thereof, reference is made to the following Description and appended Claims, together with the Drawing, in which:

DETAILED DESCRIPTION OF THE PREFERRED EMBODIMENTS

Figures 1, 2:
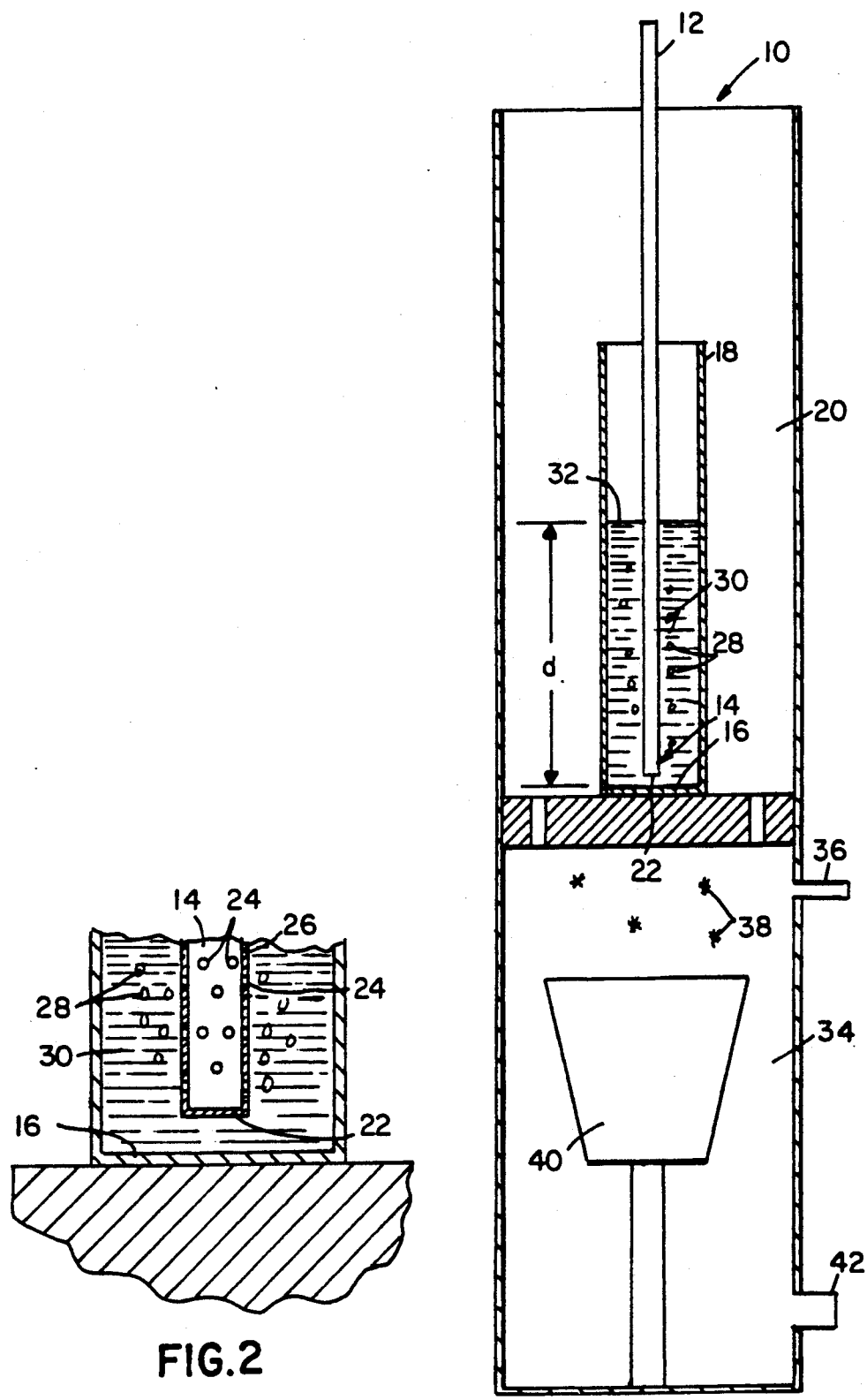
FIGS. 1 and 2 are schematic representations of a typical reactor suitable for carrying out the process in accordance with the invention.

The novel process described herein circumvents the need to remove the oxide barrier layer by causing the reaction to take place within the liquid form of the metal. This permits exposure of a continuously renewed surface of aluminum or other metal to the reactants because of mixing in the melt. The oxides and hydroxides that were present on the solid metal surface are still present in the melt and on its surface. However, the large differences in surface tension and density between the compounds and the molten metal will tend to cause segregation of the various phases. Thus the oxide will tend to float if the particles are small and will tend to sink if they become large, removing the oxide particles to either the surface or the bottom of the melt and leaving a purer metal at the middle region of the melt.

The physical arrangement of a typical reactor suitable for carrying out the process in accordance with the invention is shown schematically in FIGS. 1 and 2. In CVP reactor 10, tube 12 conducts incoming chlorine gas to tube outlet 14 near bottom region 16 of crucible 18 in first section 20 of reactor 10. Tube 12 is conveniently closed at its lower end 22, and holes 24 along tube wall 26 near closed end 22 provide tube outlet 14. The chlorine gas forms bubbles 28 at tube outlet 14, contacting aluminum melt 30. The size of holes 24 is small to increase the surface-area-to-volume ratio of the bubbles and to reduce the length of the diffusion path which chlorine gas in the center of each bubble must travel to reach the bubble surface, thereby increasing the potential for reaction between the chlorine and the aluminum.

The reactor is placed in a furnace (not shown) that is heated by known means, e.g. a resistance or inductive heater. The reaction between aluminum melt 30 and the chlorine in bubbles 28 (Reaction 1) forms aluminum chloride, $Al_2Cl_6$, as a vapor, because the melting temperature of aluminum metal is greater than the sublimation temperature of $Al_2Cl_6$.

Additionally, the higher vapor pressure chlorides of the impurities in melt 30 also are produced as vapors. As bubbles 28 of vapors including the impurity chloride vapors pass upward through melt 30, the impurity chlorides react with the excess aluminum in melt 30, reducing the impurity chlorides to the lower vapor pressure metallic form, and producing additional $Al_2Cl_6$ vapor. These reduced impurity metals redissolve in the aluminum melt 30, remaining there unless they are again exposed to fresh chlorine gas from bubbles 28. As the chlorine and impurity gases in bubbles 28 are depleted and more $Al_2Cl_6$ vapor is produced, the proportion of $Al_2Cl_6$ vapor within bubbles 28 increases, becoming essentially pure $Al_2Cl_6$ vapor as bubbles 28 approach surface 32 of melt 30.

The purified $Al_2Cl_6$ vapor rises to and escapes from surface 32 of melt 30. The purified vapor is then transported to second section 34 of reactor 10 to isolate the vapor from the starting materials. In second section 34 the purified vapor contacts a fluorinating agent, $RF_x$, introduced at one or more second inlets 36, and is converted to fluoride powder 38 by Reaction 4.

$$Al_2Cl_6 \uparrow + (6/x)RF_x \uparrow \longrightarrow 2AlF_3 \downarrow + (6/x)RCl_x \uparrow \quad (4)$$

In Reaction 4, R represents a convenient cation, e.g. C, S, N, or H, that easily forms a vapor with the anion of the reactive transport agent and does not interfere with other aspects of the reaction. The number of fluoride ions necessary to balance the charge of the cation is represented by x.

The major portion of fluoride powder 38 falls into container 40, while any remaining powder exits the reactor at outlet 42 with the flowing gases, and is separated out by conventional means, not shown. Alternatively, the fluorinating agent may be $F_2$. Also, bromine or iodine gas may be substituted for the preferred chlorine as the halogen reactant in Reaction 1.

The above-described process is applicable to the preparation of other materials in addition to $Al_2Cl_6$ and $AlF_3$. Such other materials include the equivalent gallium and indium compounds, although the reactions for these materials are more complicated due to the larger number of valence states of the halide compounds. Both gallium and indium metals have very low melting temperatures, 30° and 157° C. respectively, and extraordinarily high boiling temperatures, at least 2000° C. The melting and boiling temperatures of these three elements and their pertinent compounds are shown in Table II. Table II indicates that preparation of aluminum fluoride by the above-described process requires an operating temperature suitably above the melting temperature, 660° C., of aluminum, while preparation of the gallium and indium compounds is controlled by the respective vapor pressures of their chlorides.

TABLE 2

| Metal | Metal | | Valence | Chloride | | Fluoride | |
|---|---|---|---|---|---|---|---|
| | Melt | Boil | | Melt | Boil | Melt | Boil |
| Al | 660 | 2467 | 3+ | * | 183 | * | 1291 |
| Ga | 30 | 2403 | 2+ | 164 | 535 | — | — |

TABLE 2-continued

| Metal | Metal | | Valence | Chloride | | Fluoride | |
|---|---|---|---|---|---|---|---|
| | Melt | Boil | | Melt | Boil | Melt | Boil |
| | | | 3+ | 78 | 201 | * | ≈1000 |
| In | 157 | 2000 | 1+ | 225 | 608 | — | — |
| | | | 2+ | 235 | 560 | — | — |
| | | | 3+ | 586 | 600 | 1170 | >1200 |

*compound sublimes

Upon first examination, it might appear that any compounds exhibiting acceptable melting and boiling points can be prepared in purified form by this process. However, the reconversion/reduction reaction, Reaction 2 or its equivalent, must thermodynamically favor formation of the desired metal halide for effective application of the process. For example, in the case of tin, the formation of many of the impurities of interest, e.g. iron and nickel, are all more favored to form than the desired tin compound. Potentially the reverse procedure could be applied to remove the impurities from the melt leaving the purified metal, but this process would be subject to the same asymptotic limit observed in other processes.

In a preferred process, the number and size of bubbles 28 of $Cl_2/Al_2Cl_6$ vapor and the distance d they must rise through the melt are carefully controlled. These parameters determine the efficiency of Reaction 1, and more importantly the purification of the stream by Reaction 2, and thus the rate of transport of purified $Al_2Cl_6$ to the fluorinator. It is preferred that the bubbles should be as small as feasible, so that the ratio of bubble surface area to bubble volume is high. It is also preferred that the number of bubbles and the distance d they must rise through the melt are both high. Many small bubbles, with a high surface to volume ratio, and a long residence time increase both the contact time and the contact area. These conditions provide the maximum opportunity for the necessary redox reaction to take place, increasing the likelihood of removing the impurities. The bubble size and number may be controlled by adjusting the size and number of orifices 24 in the bubbler in tube outlet 14. The residence time may be increased by increasing the height of the column of molten metal above tube outlet 14, i.e. distance d; the optimum distance d is determined empirically.

Graphite is a suitable material for the construction of the reactor components. Aluminum, gallium, indium, and their above-mentioned compounds are recognized to be stable in contact with graphite. The graphite is protected from attack by air by placing the reactor in a suitable enclosure.

The following Examples are presented to enable those skilled in the art to more clearly understand and practice the present invention. These Examples should not be considered as a limitation upon the scope of the present invention, but merely as being illustrative and representative thereof.

EXAMPLE 1

A quantity of an aluminum source metal is selected sufficient to fill an open graphite crucible 50 mm in diameter by 200 mm high about 60% full of molten metal. The source metal is cleaned by etching in a NaOH solution, then rinsed in ethanol and dried. The clean metal is then weighed and placed in the crucible. The crucible has a halogen gas delivery tube of graphite placed at its axial center line and extending to near the bottom of the crucible. The tube is connected at its upper end to a valved source of chlorine gas to provide the halogenating gas for the chlorinating reaction (Reaction 1), and is closed at its lower end. A series of small holes about 0.5 mm in diameter is provided in the lowermost 10 mm of the tube for distribution of the chlorine gas as fine bubbles.

The crucible and tube are placed within the upper reaction zone of a two-zone graphite reactor furnace similar to that shown in FIG. 1. The reaction zones are surrounded and heated by induction heaters, and communicate via channels in a graphite divider between the zones. A valved source of HF gas is provided to the lower reaction zone through the side wall of the furnace below the divider.

The furnace is purged with argon, and heated to a temperature of 750° C. to melt the aluminum pieces, with only argon flowing through all gas inlets. A flow of argon is maintained through the halogen gas delivery tube throughout the melting process to prevent the molten metal from flowing into the tube, and to purge the reaction zone of air and water vapor. When the desired temperature is reached and melting is complete, the reaction is started. This is accomplished by terminating the argon flow simultaneously with initiation of the flow of chlorine gas. The flow of HF is begun when the flow of chlorine is at the desired level. The gas flows are continued for a time sufficient to produce a suitable quantity of $AlF_3$ product, but less than that required to reduce the amount of the molten metal below the depth required to purify the aluminum. At the completion of the run, the flows of chlorine and HF are switched to argon to terminate the reaction and purge the reactor. The furnace is cooled during this argon flow then opened in a clean environment to harvest the desired $AlF_3$ product from the bottom of the reactor furnace. The collected product is then ready for use in the compounding of fluoride glass.

EXAMPLE 2

The process of Example 1 is repeated, except that the source metal is gallium and the furnace temperature is 400° C. The fluoride product is pure $GaF_3$, suitable for use in the compounding of fluoride glass.

EXAMPLE 3

The process of Example 1 is repeated, except that the source metal is indium and the furnace temperature is 650° C. The fluoride product is pure $InF_3$, suitable for use in the compounding of fluoride glass.

The process described herein increases the effective contact between the metal and the reactive transport gas, providing a more efficient chemical vapor purification process, while circumventing the need to prevent and remove oxide surface layers from the metal. The metal fluoride products of this novel are sufficiently pure for as-produced use in the manufacture of optically clear fluoride glass for such applications as optical fibers, tunable solid state lasers, and dielectric layers for complex semiconductor structures. The novel method, however, is not limited to compounds intended for such uses.

While there has been shown and described what are at present considered the preferred embodiments of the invention, it will be obvious to those skilled in the art that various changes and modifications can be made therein without departing from the scope of the invention as defined by the appended claims.

We claim:

1. A chemical vapor purification process for preparing metal fluorides comprising:
   melting a metal selected from the group consisting of metals forming halides and thermodynamically partitionable from Fe, Cu, Ni, and Co cation contaminants to form a melt of said metal;
   bubbling through a stoichiometric excess of said melt, a reactive transport agent selected from the group consisting of chlorine, bromine, and iodine, under reaction conditions selected to result in generation of a gaseous halide compound of said metal;
   isolating said gaseous halide compound of said metal from said melt; and
   reacting said isolated gaseous halide compound with a gaseous fluorinating agent to form a solid fluoride of said metal.

2. A process in accordance with claim 1 wherein said metal is selected from the group consisting of aluminum, gallium, and indium.

3. A process in accordance with claim 1 wherein said reactive transport agent is chlorine.

4. A process in accordance with claim 1 wherein said fluorinating agent is selected from the group consisting of fluorine gas, sulfur hexafluoride, sulfur tetrafluoride, hydrogen fluoride, and nitrogen trifluoride.

5. A chemical vapor purification process for preparing metal fluorides comprising:
   melting a metal selected from the group consisting of aluminum, gallium, and indium to form a melt of said metal;
   bubbling through a stoichiometric excess of said melt, a reactive transport agent selected from the group consisting of chlorine, bromine, and iodine, under reaction conditions selected to result in generation of a gaseous halide compound of said metal;
   isolating said gaseous halide compound of said metal from said melt; and
   reacting said isolated gaseous halide compound with a gaseous fluorinating agent selected from the group consisting of fluorine gas, sulfur hexafluoride, sulfur tetrafluoride, hydrogen fluoride, and nitrogen trifluoride to form a solid fluoride of said metal.

6. A process in accordance with claim 5 wherein said reactive transport agent is chlorine and said fluorinating agent is fluorine gas or hydrogen fluoride.

7. A chemical vapor purification process for preparing metal fluorides comprising:
   melting a metal selected from the group consisting of aluminum, gallium, and indium to form a melt of said metal;
   bubbling through a stoichiometric excess of said melt, a reactive transport agent selected from the group consisting of chlorine, bromine, and iodine, under reaction conditions selected to result in generation of a gaseous halide compound of said metal;
   isolating said gaseous halide compound of said metal from said melt; and
   reacting said isolated gaseous halide compound with a gaseous fluorinating agent to form a solid fluoride of said metal.

* * * * *